United States Patent
Lim et al.

(10) Patent No.: US 10,532,734 B2
(45) Date of Patent: Jan. 14, 2020

(54) HYBRID VEHICLE AND METHOD OF CONTROLLING MOTOR OF THE SAME

(71) Applicants: HYUNDAI MOTOR COMPANY, Seoul (KR); KIA MOTORS CORPORATION, Seoul (KR)

(72) Inventors: Jae Sang Lim, Suwon-si (KR); Young Un Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 4 days.

(21) Appl. No.: 15/850,897

(22) Filed: Dec. 21, 2017

(65) Prior Publication Data
US 2019/0031183 A1    Jan. 31, 2019

(30) Foreign Application Priority Data
Jul. 31, 2017    (KR) .......................... 10-2017-0096917

(51) Int. Cl.
| | |
|---|---|
| *B60W 20/40* | (2016.01) |
| *B60W 20/14* | (2016.01) |
| *B60L 15/20* | (2006.01) |
| *B60W 10/24* | (2006.01) |
| *B60L 7/16* | (2006.01) |

(Continued)

(52) U.S. Cl.
CPC ............ *B60W 20/40* (2013.01); *B60L 7/16* (2013.01); *B60L 15/2009* (2013.01); *B60L 15/2054* (2013.01); *B60L 50/16* (2019.02); *B60W 10/08* (2013.01); *B60W 10/24* (2013.01); *B60W 20/14* (2016.01); *B60L 2240/423* (2013.01); *B60Y 2200/92* (2013.01); *F16D 2500/10412* (2013.01)

(58) Field of Classification Search
CPC ...... B60W 20/40; B60W 20/14; B60W 10/24; B60W 10/08; B60L 50/16; B60L 15/2054; B60L 58/13; B60L 15/2009; B60L 7/16; B60L 2240/423; B60Y 2200/92; F16D 2500/10412
USPC ........................................................ 318/729
See application file for complete search history.

(56) References Cited

U.S. PATENT DOCUMENTS

| 2005/0103544 A1* | 5/2005 | Takami ................. B60K 6/365 |
|---|---|---|
| | | 180/65.235 |
| 2007/0056784 A1* | 3/2007 | Joe .......................... B60K 6/48 |
| | | 180/65.245 |

(Continued)

*Primary Examiner* — Jorge L Carrasquillo
*Assistant Examiner* — Devon A Joseph
(74) *Attorney, Agent, or Firm* — Morgan, Lewis & Bockius LLP

(57) ABSTRACT

A control method of a hybrid vehicle capable of increasing regenerative braking efficiency by controlling an operating point of an electric motor includes steps of determining, by a hybrid control unit (HCU), a first torque for an generation mode operation of an electric motor, determining, by the HCU, whether the first torque and a speed of the electric motor correspond to an operating point for achieving charge of a battery through the generation mode operation, and, upon determining that the first torque and the speed of the electric motor correspond to an operating point at which the charge of the battery is disabled, changing, by the HCU, the first torque into a second torque that corresponds to an operating point at which the charge of the battery is achieved.

13 Claims, 8 Drawing Sheets

(51) Int. Cl.
 B60W 10/08 (2006.01)
 B60L 50/16 (2019.01)

(56) References Cited

U.S. PATENT DOCUMENTS

| | | | |
|---|---|---|---|
| 2015/0057857 A1* | 2/2015 | Katsuta | F01N 3/2013 |
| | | | 701/22 |
| 2016/0368477 A1* | 12/2016 | Du | B60W 10/06 |
| 2017/0274755 A1* | 9/2017 | Yoshida | B60K 6/485 |

* cited by examiner

--RELATED ART--

--RELATED ART--

HYBRID VEHICLE AND METHOD OF CONTROLLING MOTOR OF THE SAME

This application is based on and claims the benefit of priority to Korean Patent Application No. 10-2017-0096917, filed on Jul. 31, 2017 with the Korean Intellectual Property Office, which is hereby incorporated by reference as if fully set forth herein.

TECHNICAL FIELD

The present disclosure relates to a hybrid vehicle and a method of controlling the same, and more particularly, to a hybrid vehicle capable of increasing regenerative braking efficiency by controlling an operating point of an electric motor and a method of controlling the same.

BACKGROUND

In general, a hybrid electric vehicle (HEV) is a vehicle that uses two types of power sources together, and the two types of power sources are typically an engine and an electric motor. Such a hybrid vehicle has excellent fuel efficiency and power performance and is advantageous in that the amount of exhaust emissions is reduced compared to a vehicle having only an internal combustion engine, and thus has been actively developed in recent years.

FIG. 1 illustrates an exemplary structure of a powertrain of a general hybrid vehicle.

Referring to FIG. 1, the powertrain of the hybrid vehicle adopts a parallel-type hybrid system, in which an electric motor (or a drive motor) 140 and an engine clutch (EC) 130 are mounted between an internal combustion engine (ICE) 110 and a transmission 150. In particular, since the electric motor 140 is mounted close to the transmission 150, the powertrain system of the hybrid vehicle may also be referred to as a transmission-mounted-electric-device-type (TMED-type) system.

Typically, when a driver depresses an accelerator pedal after starting the vehicle, the motor 140 is first driven using the electrical power of a high-voltage battery 160 in the state in which the engine clutch 130 is opened, and wheels are moved by the power transferred from the motor to a final drive (FD) (not shown) via the transmission 150 (i.e. an EV mode). When a greater driving force is required due to the gradual acceleration of the vehicle, the engine 110 may be driven by operating an auxiliary motor (or a starter/generator motor) 120.

Thus, when the number of revolutions per minute of the engine 110 and the number of revolutions per minute of the motor 140 are equal to each other, the engine clutch 130 is engaged so that the vehicle is driven by both the engine 110 and the motor 140 or by only the engine 110 (i.e. transition from the EV mode to an HEV mode). When a predetermined engine-off condition, such as the deceleration of the vehicle, is satisfied, the engine clutch 130 is opened and the engine 110 is stopped (i.e. transition from the HEV mode to the EV mode). In such a hybrid vehicle, a battery may be charged by converting the driving force of the wheels into electrical energy when a braking operation is performed, which is referred to as braking energy regeneration or regenerative braking.

The starter/generator motor 120 serves as a starter motor when the engine is started, and also serves as a generator when the rotational energy of the engine is recovered after starting or when starting off. Therefore, the starter/generator motor 120 may be referred to as a "hybrid starter generator (HSG)", or may also be referred to as an "auxiliary motor" in some cases.

Describing the HSG 120 and the electric motor 140 in terms of current flow, the high-voltage battery 160 outputs a DC voltage, and an inverter 180 appropriately converts the DC voltage into an AC voltage in accordance with a torque command and a rotational speed of the electric motor 140. The converted AC voltage is supplied to the electric motor 140 and the HSG 120 so as to drive the vehicle or start the engine. The inverter 180 also converts the counter electromotive force of the electric motor 140 and the HSG 120 due to the driving force of the traveling vehicle or regenerative braking into a DC voltage so as to charge the high-voltage battery 160.

Hereinafter, the flow of high-voltage energy depending on whether the electric motor is performing a charge or discharge operation will be described with reference to FIG. 2.

FIG. 2 is a view schematically illustrating the flow of energy depending on the operation of the electric motor in a general hybrid vehicle.

Referring to FIG. 2, in the hybrid vehicle, when the electric motor 140 operates in a discharge mode, electrical energy for driving is transferred from the battery 160 to the electrical motor 140 via the inverter 180. When the electric motor 140 operates in a charge mode, charge energy, which is generated by the electrical motor 140, is transferred to the battery 160 via the inverter 180.

On the assumption that the electric motor 140 rotates at a constant speed in the positive (+) direction, the motor torque has a positive (+) value in the discharge mode for generating driving force, and has a negative (−) value in the charge mode.

However, at some operating points of the motor, the loss of energy may be larger than the charge energy generated by electricity generation due to loss in the energy transfer path, including copper loss of the motor. A driver expects that the battery will be charged whenever regenerative braking is performed, but in practice there is a problem in that the battery may be discharged depending on the operating point of the motor.

SUMMARY

Accordingly, the present disclosure is directed to a hybrid vehicle and a method of controlling the same that substantially obviate one or more problems due to limitations and disadvantages of the related art.

An object of the present disclosure is to provide a hybrid vehicle capable of traveling more efficiently and a method of controlling the same.

More particularly, an object of the present disclosure is to provide a method of controlling a hybrid vehicle so that a charge operation is realized normally when an electric motor operates in a charge mode but the charge operation is not properly performed, and a vehicle for performing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a hybrid vehicle includes steps of determining, by a hybrid control unit (HCU), a first torque for an electricity generation mode operation of an electric motor, determining, by the HCU, whether the first torque and a speed of the electric motor correspond to an operating point for achieving charge of a battery through the electricity generation mode operation, and, upon determining that the first torque and the speed of the electric motor correspond to an operating point at which the charge of the battery is disabled, changing, by the HCU, the first torque into a second torque that corresponds to an operating point at which the charge of the battery is achieved.

In another aspect of the present disclosure, a hybrid vehicle includes an electric motor, a hybrid controller configured to determine a first torque for an electricity generation mode operation of the electric motor, to determine whether the first torque and a speed of the electric motor correspond to an operating point for achieving charge of a battery through the electricity generation mode operation, and, upon determining that the first torque and the speed of the electric motor correspond to an operating point at which the charge of the battery is disabled, to change the first torque into a second torque that corresponds to an operating point at which the charge of the battery is achieved, and a motor controller configured to control the electric motor in response to a torque command corresponding to the second torque.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
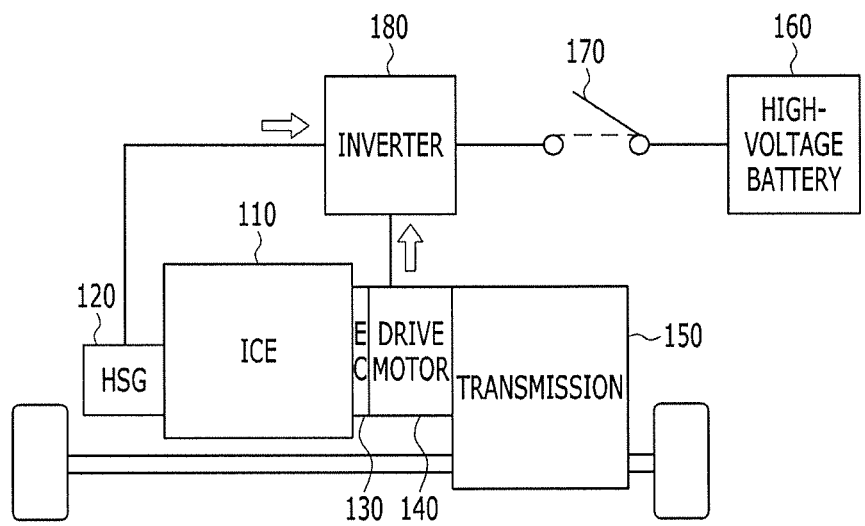
FIG. 1 illustrates an exemplary structure of a powertrain of a general hybrid vehicle.
Figure 2:
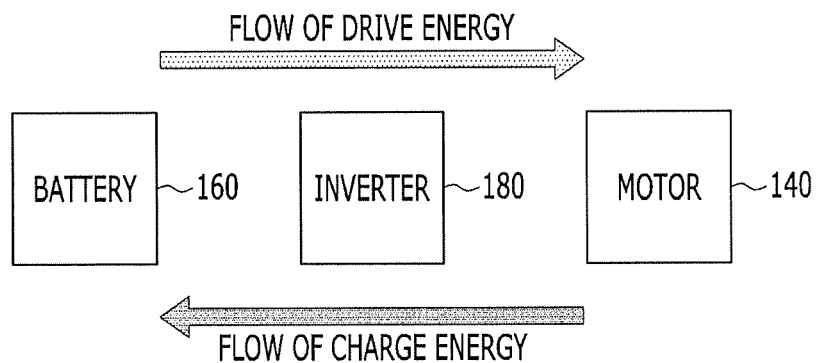
FIG. 2 is a view schematically illustrating the flow of energy depending on the operation of an electric motor in a general hybrid vehicle.

Reference will now be made in detail to the preferred embodiments of the present disclosure, examples of which are illustrated in the accompanying drawings. However, it will be understood that the present disclosure should not be limited to the embodiments and may be modified in various ways. In the drawings, to clearly and briefly explain the present disclosure, illustration of elements having no connection with the description is omitted, and the same or extremely similar elements are designated by the same reference numerals throughout the specification.

Throughout the specification, when an element is referred to as "including" another element, the element should not be understood as excluding other elements so long as there is no special conflicting description, and the element may include at least one other element. Wherever possible, the same reference numbers will be used throughout the drawings to refer to the same or like parts.

Figure 3:
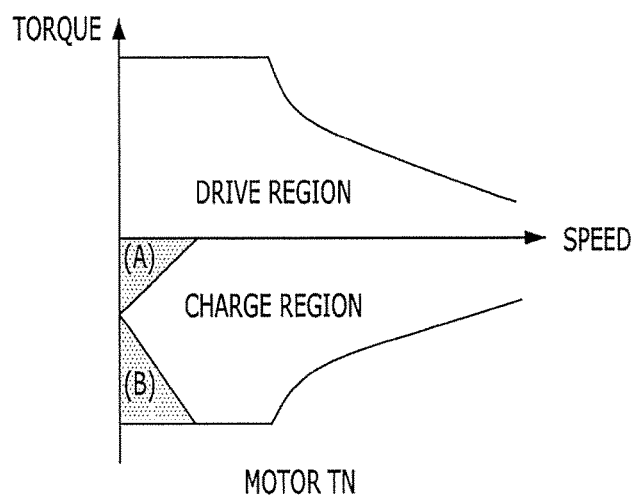
FIG. 3 is a view for explaining a concept by which a hybrid vehicle is controlled according to an embodiment of the present disclosure.

FIG. 3 is a view for explaining a concept by which a hybrid vehicle is controlled according to an embodiment of the present disclosure.

FIG. 3 illustrates a graph of an operating point of an electric motor in a hybrid vehicle, in which the horizontal axis denotes the speed of the electric motor and the vertical axis denotes the torque. In the graph, on the assumption that the electric motor rotates in one direction (speed>0), the region in which the torque has a positive value represents a driving region in which the electric motor operates in a discharge mode, and the region in which the torque has a negative value represents a charge region in which the electric motor operates in a charge mode.

When the speed of the electric motor is relatively low, the charge region includes an region (A) and a region (B), each of which is a region in which the battery is not actually charged despite operation in the charge mode (hereinafter, referred to as a "charge-disabled region" for convenience). That is, when the operating point of the electric motor corresponds to the region (A) or the region (B), the battery is not charged.

Therefore, the embodiment of the present disclosure is characterized in that, when the current operating point of the electric motor is located in the charge-disabled region, the operating point is shifted from the charge-disabled region to the chargeable region. Here, the "current operating point" refers to an operating point that is defined by the current speed of the motor and the initially determined torque of the electric motor. The "initially determined torque of the electric motor" refers to a torque that is allocated to the electric motor when the total requested torque for braking is distributed to the brake and the electric motor in accordance with the predetermined reference.

In addition, whether the operating point of the electric motor is located in the charge-disabled region may be determined based on predetermined information about the charge-disabled region. For example, the information about the charge-disabled region may be map-type information established in consideration of the speed and torque of the electric motor.

In addition, the shift of the operating point from the charge-disabled region to the chargeable region may be achieved by changing the torque. In the case in which the charge-disabled region is generated as shown in FIG. 3, when the speed of the electric motor exceeds a predetermined level, the operating point is not naturally located in the charge-disabled region. In many cases, when regenerative braking is performed, the operating point of the electric motor is located in the charge region. Generally, the rotational speed of the motor is decreased by deceleration due to regenerative braking. The rotational speed of the motor may also be changed by shifting gears. Therefore, it may be desirable to control the torque, which can be controlled relatively freely compared to the speed of the electric motor, during regenerative braking. For example, in the case in which the current operating point of the electric motor is located in the region (A) in FIG. 3, the operating point may escape from the charge-disabled region by performing control of increasing the absolute value of the torque. In the case in which the current operating point of the electric motor is located in the region (B) in FIG. 3, the operating point may escape from the charge-disabled region by performing control of decreasing the absolute value of the torque. In the hybrid vehicle, the total braking torque $T_{ALL}$ is the sum of the braking torque $T_B$ of the friction brake and the regenerative braking torque $T_M$ of the electric motor. Therefore, in order to control the regenerative braking torque of the electric motor, both the total braking torque and the braking torque of the brake need to be taken into consideration, and a detailed description thereof will be made later.

Hereinafter, each charge-disabled region will be described with reference to FIGS. 4 and 5.

Figure 4:
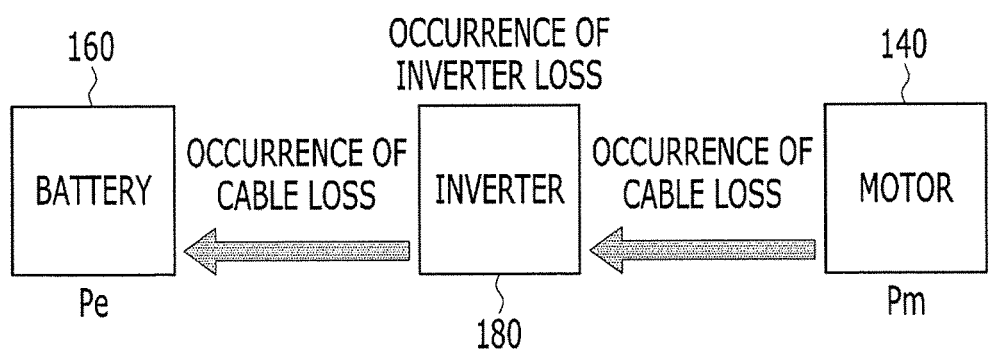
FIG. 4 is a view for explaining an region (A) in FIG. 3.
Figure 5:
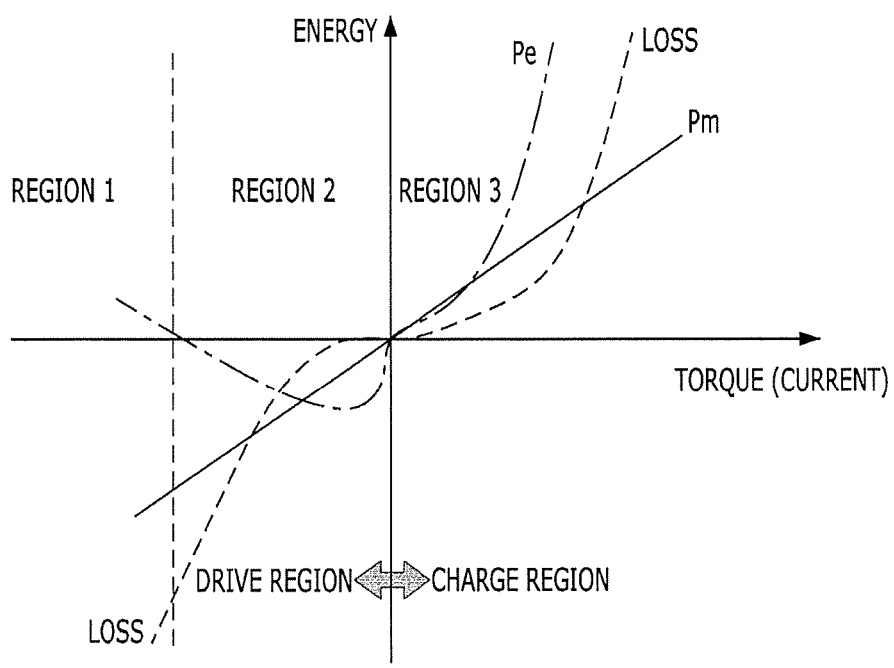
FIG. 5 is a view for explaining a region (B) in FIG. 3.

FIG. 4 is a view for explaining the region (A) in FIG. 3, and FIG. 5 is a view for explaining the region (B) in FIG. 3.

First, the region (A) will be explained with reference to FIG. 4.

The kinetic energy Pm (mechanical power) of the electric motor 140 may be expressed by multiplying the speed w of the motor by the torque T of the motor. The region (A) is located in the region in which both the speed and the torque are low (refer to FIG. 3). Therefore, the magnitude of the kinetic energy (or mechanical power) that can be converted into electrical energy through the electricity-generating operation of the electric motor is fundamentally small.

In this case, a certain amount of the generated electrical power is lost while being transferred to the battery 160 via the inverter 180 due to inverter loss and cable loss as well as copper loss of the electric motor 140.

In order to realize the charge operation, the generated electrical power, which is transferred to the battery 160, must be larger than the power Pe (electrical power, the product of multiplication of the voltage of the battery by the current of the battery) of the battery. In other words, the value derived by subtracting the absolute value of Pe from the absolute value of Pm must be larger than the total loss (i.e. the sum of the inverter loss and the cable loss).

Although the operating point of the electric motor is located in the charge region, if the value of Pm is not sufficiently large, the battery 160 cannot be charged. The group of operating points in this charge-disabled situation forms the region (A).

Now, the region (B) will be described with reference to FIG. 5.

In FIG. 5, the horizontal axis denotes torque and the vertical axis denotes power. Because the current of the generated electrical power is proportional to the torque, the values in the horizontal axis may also be regarded as being proportional to the current. The graph in FIG. 5 may be sectioned into three regions in accordance with the magnitude of the torque. Region 1 is a region in which the torque of the electric motor has a negative value but the power of the battery has a positive value (i.e. discharge). Region 2 is a region in which the torque of the electric motor has a negative value and the power of the battery has a negative value (i.e. charge). Region 3 is a region in which the torque of the electric motor has a positive value and the power of the battery has a positive value. The characteristics of the respective regions are shown in the following Table 1.

TABLE 1

|  | Region 1 | Region 2 | Region 3 |
| --- | --- | --- | --- |
| Pm | Charge Power | Charge Power | Discharge Power |
| Pe | Discharge Power | Charge Power | Discharge Power |
| Relationship Between Loss and Input Power | Pm < Loss | Pm > Loss | Pe > Loss |

Region 1 and region 2 are related to the charge region, and region 3 is related to the drive region. Although related to the charge region, region 1 is regarded as corresponding to the region (B) because the battery is not charged but is discharged (Pe>0, Pm<Loss).

As shown in FIG. 3, the region (B) is a region in which the range of the speed of the motor is similar to that in the region (A) but the torque is relatively large. In this region (B), as shown in FIG. 5, the larger the torque, the larger the current of the generated electrical power. In addition, because copper loss is proportional to the square of the current, as the torque increases, the loss increases much more sharply, making it impossible to charge the battery.

Therefore, in the case in which the operating point of the electric motor is located in region 1, the battery may be charged by shifting the operating point to region 2 through a reduction in the magnitude of the torque.

As described above, in the case in which the current operating point of the electric motor corresponds to the charge-disabled region, the battery may be charged by changing the torque so that the operating point escapes from the charge-disabled region. However, in order to achieve this operation, it is necessary to first determine whether the current operating point is located in the charge-disabled region. In addition, whether the charge-disabled region, in which the current operating point is located, is the region (A) or the region (B) is determined so as to determine whether to increase the torque or decrease the torque in order to enable the current operating point to escape from the charge-disabled region. Therefore, the embodiment of the present disclosure is characterized in that a map of the charge-disabled region (hereinafter, referred to as a "charge-disabled region map" for convenience) is established and in that a method of controlling the torque for escape of the current operating point from the charge-disabled region is determined based on the established charge-disabled region map.

In order to establish the charge-disabled region map, there is a need for a method of determining whether the current operating point of the electric motor is located in the charge-disabled region, and this embodiment may employ the following determination method.

As described above with reference to FIG. 4, there is a method of using the relationship among Pe, Pm and the loss. However, this method has a problem in that it is difficult to calculate the loss. Therefore, instead of a method of using the power of the battery, the power of the electric motor and the loss, a method of measuring the value of the current of the battery may be used, which will be described with reference to FIG. 6.

Figure 6:
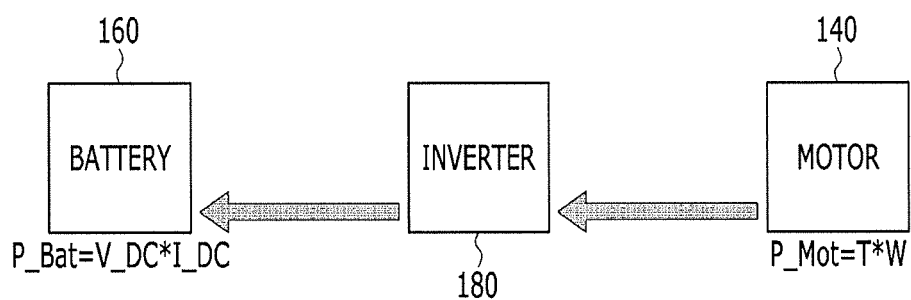
FIG. 6 is a view for explaining a method of verifying a charge-disabled region according to an embodiment of the present disclosure.

FIG. 6 is a view for explaining a method of verifying the charge-disabled region according to the embodiment of the present disclosure.

Referring to FIG. 6, the power P_Mot of the electric motor 140 is derived by multiplying the torque T and the speed W together; however, the electrical power that is transferred to the battery in practice varies depending on the loss. The direct current I_DC, which is an element for determining the power P_Bat of the battery, has a negative value during the charge operation, and has a positive value during the discharge operation.

Figure 7:
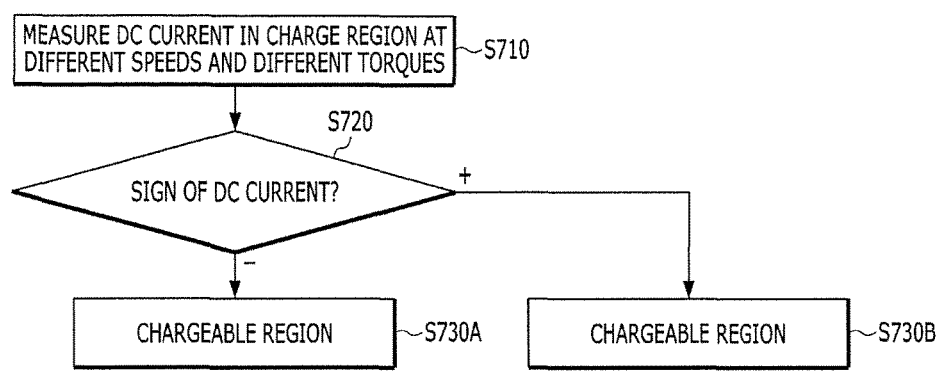
FIG. 7 is a flowchart showing an exemplary process of establishing a charge-disabled region map according to an embodiment of the present disclosure.

Therefore, the map may be established by the method shown in FIG. 7.

FIG. 7 is a flowchart showing an exemplary process of establishing the charge-disabled region map according to the embodiment of the present disclosure.

Referring to FIG. 7, when the operating point of the electric motor is located in the charge region (e.g. the speed has a positive (+) value and the torque has a negative (−) value), the direct current (DC) may be measured at different speeds and different torques (S710).

Whether the sign of the measured DC current is positive (+) or negative (−) is determined (S720). When the sign is negative (−), the corresponding operating point (the speed and the torque) may be recorded in the map as being located in the chargeable region (S730A). When the sign is positive (+), the corresponding operating point may be recorded in the map as being located in the charge-disabled region (S730B).

The process shown in FIG. 7 may be performed in an individual hybrid vehicle, or may be performed in a laboratory environment. When the process is performed in an individual hybrid vehicle traveling on an actual road, the value of the current of the DC terminal of the inverter 180 may be measured or the value of the DC current of the battery, which is managed by a battery management system (BMS), may be used. When the process is performed in a laboratory environment in a vehicle manufacturing company, a method of directly connecting a current sensor to the battery may be used. This measuring method is merely illustrative, and any method may be used as long as the DC current of the battery can be measured. When the establishment of the map is conducted in an individual hybrid vehicle, the above process may be performed in a regular period. When the establishment of the map is conducted in a laboratory environment, the established map may be installed in a vehicle or a related controller in the process of manufacturing the same, and may be updated through diagnostic communication or wireless update.

Figure 8:
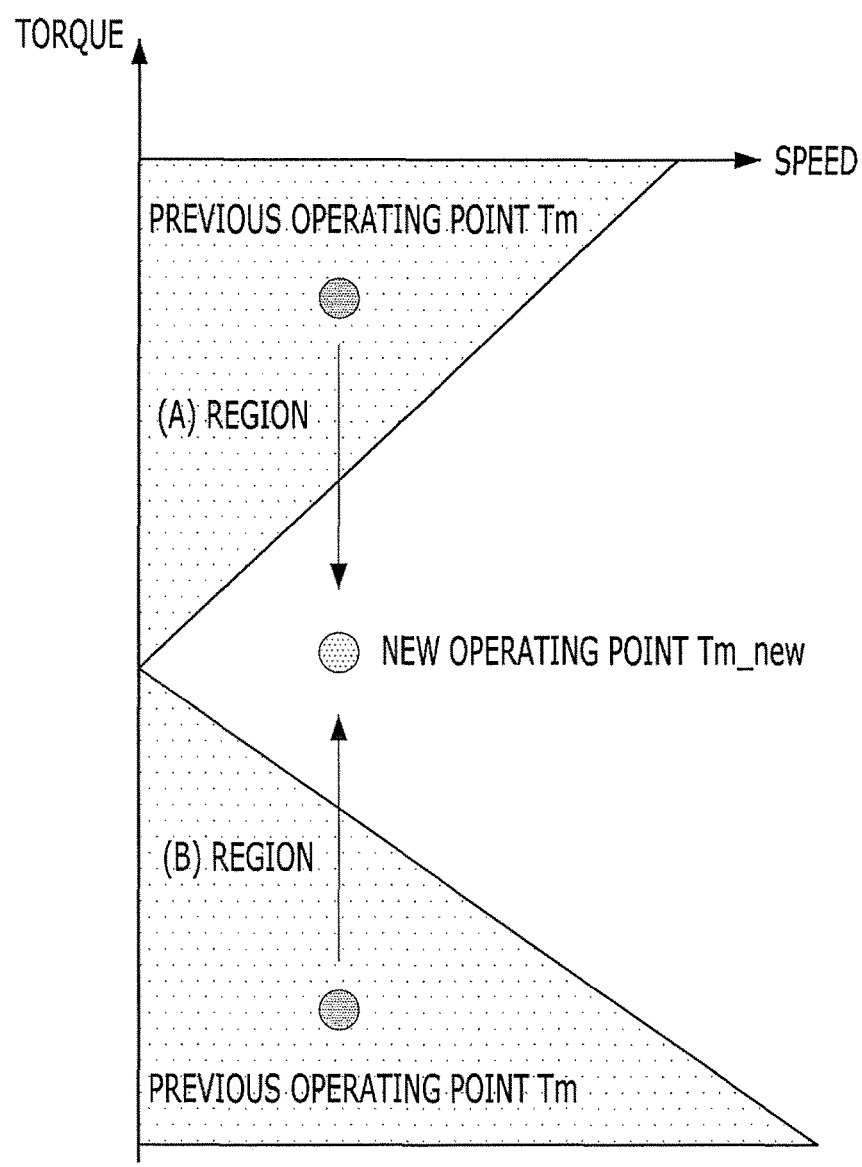
FIG. 8 illustrates an exemplary charge-disabled region map according to an embodiment of the present disclosure.

The map established through the above-described process may be analyzed in the manner shown in FIG. 8.

FIG. 8 illustrates an exemplary charge-disabled region map according to the embodiment of the present disclosure.

In FIG. 8, a charge-disabled region map is illustrated in the form of a two-dimensional graph having an axis indicating the speed and an axis indicating the torque. When an operating point Tm according to the current torque and speed of the electric motor is located in the region (A), control is performed to increase the magnitude of the torque. When the operating point Tm is located in the region (B), control is performed to decrease the magnitude of the torque. The operating point Tm is converted into a new operating point Tm_new through the above control process, and the battery may be charged at the new operating point Tm_new. The torque of the new operating point Tm_new is determined to be a value between the largest torque in the region (A) and the smallest torque in the region (B) at the corresponding speed. As the value is larger, the charging rate may be increased.

The form of the map shown in FIG. 8 is merely illustrative, and the charge-disabled region map may not necessarily have a form that is limited to the definition of the term. For example, the charge-disabled region map may alternatively be established in the form of a reference table.

When a braking torque is requested and regenerative braking is therefore performed by manipulation of the brake pedal by a driver or operation of a driving assistance system, such as an advanced driver assistance system (ADAS), a smart cruise control (SCC) system, etc., the operating point of the electric motor is typically located in the charge region. Therefore, in terms of the overall hybrid vehicle, rather than in terms of the electric motor, as described above, both the total braking torque and the torque of the brake need to be taken into consideration in order to change the torque of the motor.

Based on the above description, the overall process of controlling the braking of the hybrid vehicle when both the total braking torque and the torque of the brake are taken into consideration will be described below with reference to FIG. 9.

Figure 9:
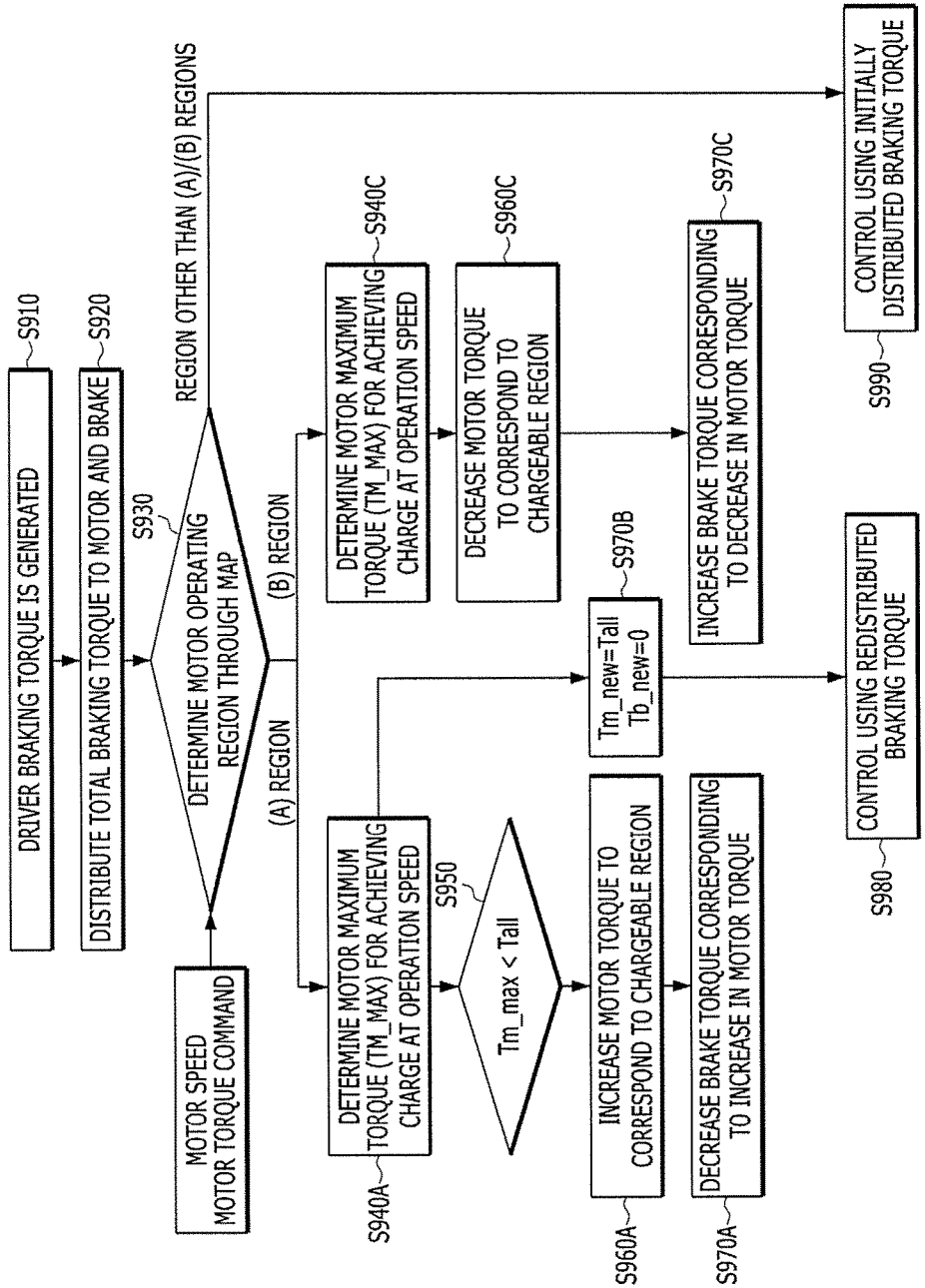
FIG. 9 illustrates an exemplary process of controlling a hybrid vehicle according to an embodiment of the present disclosure.

FIG. 9 illustrates an exemplary process of controlling the hybrid vehicle according to the embodiment of the present disclosure.

Referring to FIG. 9, a driver braking torque is generated (S910). Here, the situation in which the driver braking torque is generated may refer to a situation in which a braking torque, corresponding to the degree of manipulation of the brake pedal (i.e. the value of a brake pedal sensor (BPS)) by a driver, is requested. Even when the brake pedal is not manipulated, the braking torque may be requested by a certain driving assistance system, as described above.

The generated braking torque is the sum of the torque of the brake and the torque of the motor due to the regenerative braking. Therefore, the generated braking torque may be referred to as a total braking torque Tall. When the total braking torque Tall is determined through the value of the BPS, the total braking torque may be distributed into the motor torque Tm and the brake torque Tb in accordance with a predetermined reference stored in the hybrid vehicle (S920). The predetermined reference for distribution of the torque may be set differently for respective vehicles.

Using a method of applying the determined motor torque Tm and the current speed of the motor (i.e. the current operating point of the electric motor) to the predetermined charge-disabled region map, whether the current operating point corresponds to the region (A), the region (B) or the remaining charge region may be determined (S930).

When it is determined that the current operating point corresponds to the region (A), the maximum torque Tm_max, which enables the motor to operate in the charge mode at the current speed of the motor, may be determined (S940A). The maximum torque Tm_max is larger than the maximum torque within the region (A) with respect to the current speed. However, the maximum torque Tm_max may be the smaller one of the values of the maximum charge torque that is allowable for the corresponding motor at the current speed and the torque from which the region (B) starts (i.e. the minimum torque within the region (B) with respect to the current speed).

The determined maximum torque Tm_max and the total braking torque Tall are compared with each other (S950). When the total braking torque Tall is larger than the determined maximum torque Tm_max, the final motor torque Tm_new is increased to the determined maximum torque Tm_max (S960A).

When the torque of the motor increases, the torque of the brake needs to be decreased corresponding to the increase in the torque of the motor in order to satisfy the total braking torque (S970A). Therefore, the final brake torque Tb_new due to the change in the torque of the motor is a value derived by subtracting the final motor torque Tm_new from the total braking torque Tall.

When the total braking torque Tall is not larger than the determined maximum torque Tm_max (S950), the total braking torque Tall becomes the final motor torque Tm_new. In this case, since the torque of the motor covers the total braking torque, the final brake torque Tb_new becomes 0 (S970B).

When it is determined at step S930 that the current operating point corresponds to the region (B), the maximum torque Tm_max, which enables the motor to operate in the charge mode at the current speed of the motor, may be determined (S940C). The maximum torque Tm_max may be a value that is larger than the maximum torque within the region (A) with respect to the current speed and smaller than the torque from which the region (B) starts.

In this case, different from the region (A), the motor acts only such that the torque thereof decreases, and thus the situation in which the final motor torque Tm_new is larger than the total braking torque Tall does not occur. Therefore, a process corresponding to step S950, which is performed for the region (A), is omitted.

The final motor torque Tm_new is decreased to the determined maximum torque Tm_max (S960C). The torque of the brake needs to be increased corresponding to the decrease in the torque of the motor in order to satisfy the total braking torque (S970C). Therefore, the final brake torque Tb_new due to the change in the torque of the motor is a value derived by subtracting the final motor torque Tm_new from the total braking torque Tall.

When the redistribution of the braking torque (Tall=Tm_new+Tb_new) is completed, the braking operation corresponding thereto may be performed (S980).

When it is determined at step S930 that the current operating point does not correspond to the charge-disabled region, the braking operation may be performed in accordance with the initial distribution of the braking torque (S990).

Now, the system for controlling the hybrid vehicle according to the embodiment of the present disclosure will be described with reference to FIG. 10.

Figure 10:
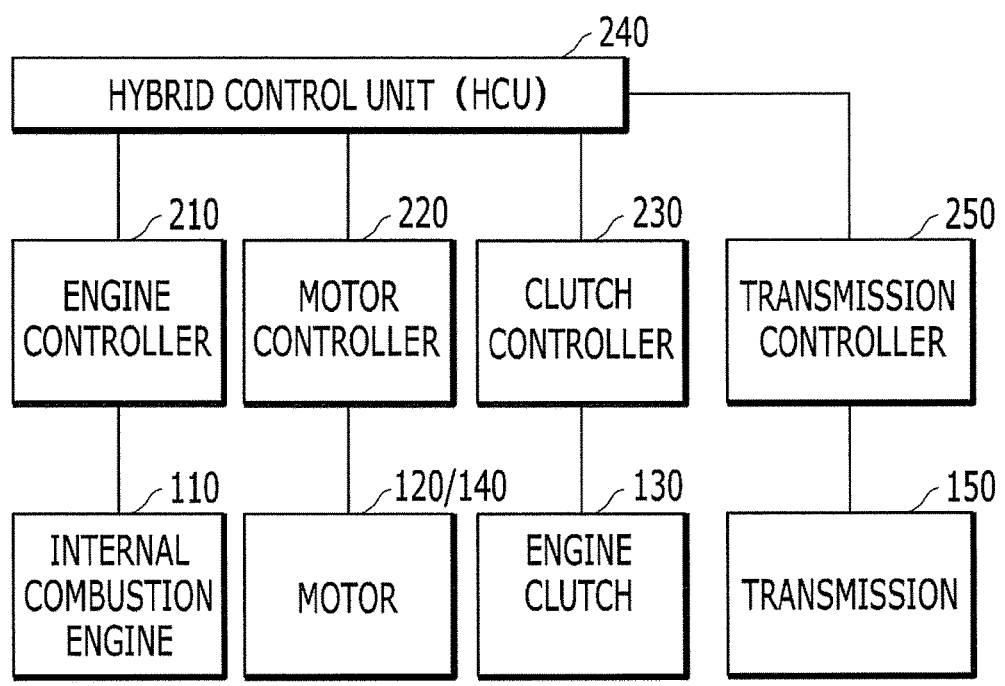
FIG. 10 is a block diagram illustrating an exemplary system for controlling a hybrid vehicle, to which the embodiments of the present disclosure are applicable.

FIG. 10 is a block diagram illustrating an exemplary system for controlling the hybrid vehicle, to which the embodiments of the present disclosure are applicable.

Referring to FIG. 10, in the hybrid vehicle, to which the embodiments of the present disclosure are applicable, the internal combustion engine 110 may be controlled by an engine controller 210, the torque of the starter/generator motor 120 and the torque of the electric motor 140 may be controlled by a motor controller 220, and the engine clutch 130 may be controlled by a clutch controller 230. The engine controller 210 may also be referred to as an engine management system (EMS). The transmission 150 is controlled by a transmission controller 250. The motor controller 220 may be embodied as the inverter 180 as needed. A controller for controlling the starter/generator motor 120 and a controller for controlling the electric motor 140 may be separately provided.

The respective controllers 210, 220, 230, 250 are connected to a hybrid control unit (HCU) 240, which is a high-level controller for controlling the overall mode conversion process. The HCU 240 may control the above controllers 210, 220, 230, 250 such that the controllers 210, 220, 230, 250 provide information necessary for the driving mode conversion, information necessary for control of the engine clutch during the gear shift and information necessary for determination of the degree of regenerative braking and/or control of the engine stop to the HCU 240 or such that the controllers 210, 220, 230, 250 perform operation in response to control signals.

Each of the HCU 240 and the controllers 210, 220, 230, 250 is an electric circuitry that executes instructions of software which thereby performs various functions described hereinafter.

Described in more detail, the HCU 240 determines whether to perform the mode conversion depending on the traveling conditions of the vehicle. For example, the HCU determines the time point at which the engine clutch 130 is released (opened), and performs control of hydraulic pressure (for a wet EC) or control of torque capacity (for a dry EC) during the released state. In addition, the HCU 240 may determine the state of the EC (e.g. "Lock-up", "Slip" or "Open"), and may control the time point at which fuel injection in the engine 110 is stopped. In addition, in order to control the engine stop, the HCU may transfer a torque command for controlling the torque of the starter/generator motor 120 to the motor controller 220, thereby controlling recovery of the rotating energy of the engine. In addition, in order to control the adaptive mode conversion, the HCU 240 may control low-level controllers to determine the conditions under which the mode is converted and to convert the mode.

In particular, in association with the embodiment, the HCU 240 may perform a determination for the overall braking control process, including the braking torque initial distribution step S920 (refer to FIG. 9) and the current operating point determination step S930, on the basis of the charge-disabled region map using the information about the speed of the electric motor transferred from the motor controller 220 and the initially distributed torque (refer to FIG. 9).

Alternatively, the processes from step S930 to step S960A, S970B or S960C may be performed by the motor controller 220. In this case, the motor controller 220 may transfer the final motor torque Tm_new to the HCU 240, and the HCU 240 may determine the final brake torque Tb_new by subtracting the final motor torque Tm_new transferred thereto from the total braking torque Tall, and may transfer the determined final brake torque Tb_new to a brake controller (not shown) for controlling the friction brake.

The connection relationships among the above-described controllers and the function and classification of each of the controllers are merely illustrative, and it will be apparent to those skilled in the art that they are not limited to the definitions of the terms. For example, any one of the controllers, other than the HCU 240, may be configured to implement the function of the HCU, or two or more other controllers may be configured to share the function of the HCU.

While the present disclosure has been described as being applied to a TMED-type hybrid vehicle, it will be understood that the present disclosure is also applicable to electric vehicles as well as to any type of hybrid vehicle, as long as the vehicle is capable of performing a regenerative braking operation through an electric motor.

The effects of the above-described control method according to the embodiment will be described with reference to FIGS. 11 and 12.

Figure 11:
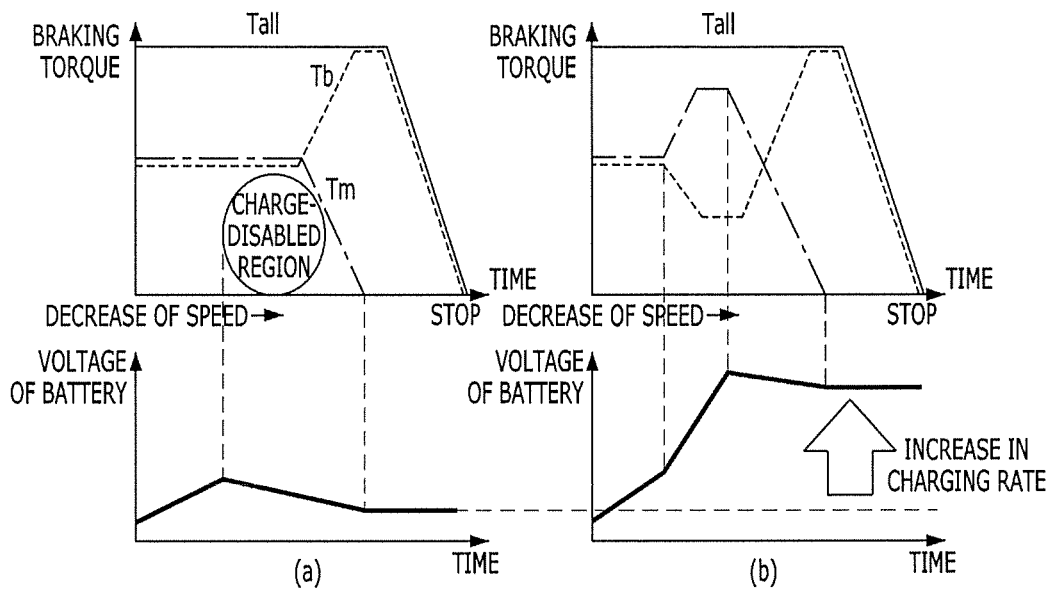
FIG. 11 is a view for explaining the effects obtained by redistribution of a braking torque when a current operating point of an electric motor corresponds to the region (A)

FIG. 11 is a view for explaining the effects obtained by redistribution of the braking torque when the current operating point of the electric motor corresponds to the region (A). FIG. 12 is a view for explaining the effects obtained by redistribution of the braking torque when the current operating point of the electric motor corresponds to the region (B).

Figure 12:
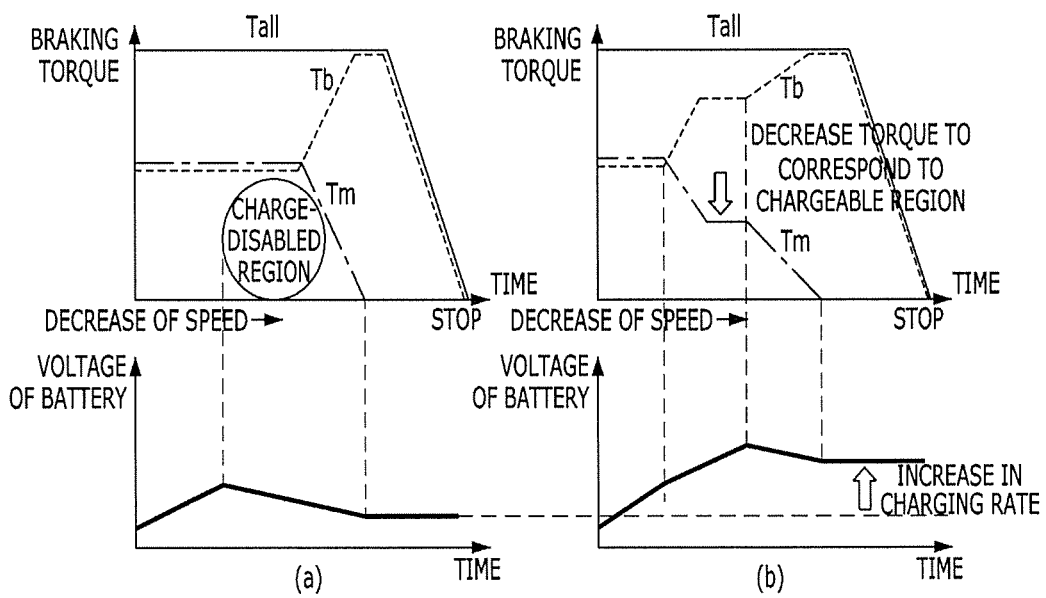
FIG. 12 is a view for explaining the effects obtained by redistribution of the braking torque when the current operating point of the electric motor corresponds to the region (B).

In FIGS. 11 and 12, the horizontal axis of each of the graphs denotes the time, the graphs on the left show the results of a conventional control method, and the graphs on the right show the results of the control method according to the embodiment. In FIGS. 11 and 12, the upper graphs show variation in the braking torque, and the lower graphs show variation in the voltage of the battery.

Referring to the graphs on the left in FIG. 11, as the braking torque is generated, the braking torque is distributed into the motor torque Tm for regenerative braking and the brake torque Tb in accordance with a predetermined reference, and the braking operation is performed. However, as the speed decreases, from the time point at which the operating point of the motor is located in the charge-disabled region (A), the voltage of the battery drops, even though the regenerative braking operation is performed. However, as shown in the graphs on the right, if the torque of the electric motor is increased at the time point at which the operating point of the motor reaches the charge-disabled region, the battery may be charged while the torque is increased higher than that in a conventional control method.

Referring to the graphs on the left in FIG. 12, as the braking torque is generated, the braking torque is distributed into the motor torque Tm for regenerative braking and the brake torque Tb in accordance with a predetermined reference, and the braking operation is performed. However, as the speed decreases, from the time point at which the operating point of the motor is located in the charge-disabled region (B), the voltage of the battery drops, even though the regenerative braking operation is performed. However, as shown in the graphs on the right, if the torque of the electric motor is decreased at the time point at which the operating point of the motor reaches the charge-disabled region, the battery may be charged while the torque is decreased lower than that in a conventional control method.

As is apparent from the above description, a hybrid vehicle associated with at least one embodiment of the present disclosure constructed as described above is capable of charging a battery through an electric motor more efficiently.

In particular, when an electric motor operates in a charge mode, whether a battery can be actually charged is determined, and when the battery cannot be charged, it is possible to enable the battery to be charged by shifting the operating point of the electric motor.

The invention described above may be implemented as computer-readable code in a medium in which a program is recorded. Computer-readable recording media include all kinds of recording devices in which data readable by computer systems is stored. The computer-readable recording media include a Hard Disk Drive (HDD), a Solid State Drive (SSD), a Silicon Disk Drive (SDD), a ROM, a RAM, a CD-ROM, a magnetic tape, a floppy disk, an optical data storage system, etc.

It will be apparent to those skilled in the art that various modifications and variations can be made in the present disclosure without departing from the spirit or scope of the invention. Thus, it is intended that the present disclosure covers the modifications and variations of this invention provided they come within the scope of the appended claims and their equivalents.

What is claimed is:

1. A method of controlling a hybrid vehicle, the method comprising steps of:
   determining, by a hybrid control unit (HCU), a total braking torque during a regenerative braking mode of the hybrid vehicle;
   distributing, by the HCU, the total braking torque into a regenerative braking torque applied to an electric motor and a friction braking torque applied to a brake, wherein the regenerative braking torque is at a first torque level and the electric motor is at a first speed;
   determining, by the HCU, whether charge of a battery during the regenerative braking mode is disabled by identifying whether the first torque level of the regenerative braking torque and the first speed of the electric motor are in at least one charge-disabled region of a predetermine map, wherein:
      the predetermined map comprises a chargeable region in which the charge of the battery is enabled during the regenerative braking mode and the at least one charge-disabled region in which the charge of the batter is disabled during the regenerative braking mode, and
      the chargeable region and the at least one charge-disabled region are defined by a torque level and a speed of the electric motor;
   upon determining that the charge of the battery is disabled at the first torque level and the first speed, increasing or decreasing, by the HCU, the regenerative braking torque from the first torque level to a second torque level which is in the chargeable region; and
   changing, by the HCU, a current torque level of the friction braking torque to a new torque level, corresponding to the increased or decreased regenerative braking torque in consideration of the total braking torque.

2. The method according to claim 1, wherein the at least one charge-disabled region comprises a first charge-disabled region and a second charge-disabled region, and
   wherein the first charge-disabled region is a region having a smaller torque than the second charge-disabled region.

3. The method according to claim 2, wherein the step of increasing or decreasing the regenerative braking torque from the first torque level to a second torque level comprises:
   when the first torque level and the first speed correspond to the first charge-disabled region, determining the second torque level to be a value that is larger than the first torque level and corresponds to a region other than the first charge-disabled region.

4. The method according to claim 3, wherein the second torque level is smaller than a minimum torque within the second charge-disabled region at the first speed.

5. The method according to claim 2, wherein the step of increasing or decreasing the regenerative braking torque from the first torque level to a second torque level comprises:

when the first torque level and the first speed correspond to the second charge-disabled region, determining the second torque level to be a value that is smaller than the first torque level and corresponds to a region other than the second charge-disabled region.

6. The method according to claim 5, wherein the second torque level is larger than a maximum torque within the first charge-disabled region at the first speed.

7. A non-transitory computer-readable recording medium in which a program for executing the method of controlling a hybrid vehicle according to claim 1 is recorded.

8. A hybrid vehicle comprising:
an electric motor;
a hybrid control unit (HCU) configured to:
determine a total braking torque during a regenerative braking mode of the hybrid vehicle;
distribute the total braking torque into a regenerative braking torque applied to the electric motor and a friction braking torque applied to a brake, wherein the regenerative braking torque is at a first torque level and the electric motor is at a first speed;
determine whether charge of a battery during the regenerative braking mode is disabled by identifying whether the first torque level of the regenerative braking torque and the first speed of the electric motor are in at least one charge-disabled region of a predetermined map, wherein:
the predetermined map comprises a chargeable region in which the charge of the battery is enabled during the regenerative braking mode and the at least one charge-disabled region in which the charge of the battery is disabled during the regenerative braking mode, and
the chargeable region and the at least one charge-disabled region are defined by a torque level and a speed of the electric motor;
upon determining that the charge of the battery is disabled at the first torque level and the first speed, increase or decrease the regenerative braking torque from the first torque level to a second torque level which is in the chargeable region; and
change a current torque level of the friction braking torque to a new torque level, corresponding to the increased or decreased regenerative braking torque in consideration of the total braking torque; and a motor controller configured to control the electric motor in response to a torque command corresponding to the second torque level.

9. The hybrid vehicle according to claim 8, wherein the at least one charge-disabled region comprises a first charge-disabled region and a second charge-disabled region, and wherein the first charge-disabled region is a region having a smaller torque than the second charge-disabled region.

10. The hybrid vehicle according to claim 9, wherein, when the first torque level and the first speed correspond to the first charge-disabled region, the HCU determines the second torque level to be a value that is larger than the first torque level and corresponds to a region other than the first charge-disabled region.

11. The hybrid vehicle according to claim 10, wherein the second torque level is smaller than a minimum torque within the second charge-disabled region at the first speed.

12. The hybrid vehicle according to claim 9, wherein, when the first torque level and the first speed correspond to the second charge-disabled region, the HCU determines the second torque level to be a value that is smaller than the first torque level and corresponds to a region other than the second charge-disabled region.

13. The hybrid vehicle according to claim 12, wherein the second torque level is larger than a maximum torque within the first charge-disabled region at the first speed.

* * * * *